US009805068B1

(12) United States Patent
Sabjan et al.

(10) Patent No.: US 9,805,068 B1
(45) Date of Patent: Oct. 31, 2017

(54) SYSTEMS AND METHODS FOR FACILITATING FEATURES OF SYSTEM RECOVERY ENVIRONMENTS DURING RESTORE OPERATIONS

(71) Applicant: Symantec Corporation, Mountain View, CA (US)

(72) Inventors: Check A. Sabjan, Sanford, FL (US); Lokesha B. Krishnamurthy, Sanford, FL (US); Mark Nicolini, Orlando, FL (US); Suren Sethumadhavan, Lake Mary, FL (US)

(73) Assignee: Veritas Technologies LLC, Mountain View, CA (US)

( * ) Notice: Subject to any disclaimer, the term of this patent is extended or adjusted under 35 U.S.C. 154(b) by 600 days.

(21) Appl. No.: 14/016,025

(22) Filed: Aug. 30, 2013

(51) Int. Cl.
*G06F 17/00* (2006.01)
*G06F 17/30* (2006.01)

(52) U.S. Cl.
CPC .............. *G06F 17/30289* (2013.01)

(58) Field of Classification Search
CPC .................................. G06F 17/30289
USPC ....................................... 707/645
See application file for complete search history.

(56) References Cited

U.S. PATENT DOCUMENTS

| | | | | |
|---|---|---|---|---|
| 6,381,694 B1 * | 4/2002 | Yen | ............. | G06F 11/1417 713/1 |
| 6,535,998 B1 * | 3/2003 | Cabrera | ............. | G06F 11/142 714/15 |
| 6,820,214 B1 * | 11/2004 | Cabrera | ............. | G06F 11/1469 714/15 |
| 6,851,073 B1 * | 2/2005 | Cabrera | ............. | G06F 11/1417 714/15 |
| 7,478,117 B1 * | 1/2009 | Lamb | ............. | G06F 11/1466 |
| 7,734,945 B1 * | 6/2010 | Levidow | ............. | G06F 11/079 714/3 |
| 8,209,290 B1 * | 6/2012 | Dowers, II | ............. | G06F 17/30289 707/640 |

(Continued)

OTHER PUBLICATIONS

"How can I repair the Windows 8 EFI Bootloader?", http://www.google.com/url?sa=t&rct=j&q=winre%20partition%20uefi%20backup&source=web&cd=4&cad=rja&ved=0CEkQFjAD&url=http%3A%2F%2Fsuperuser.com%2Fquestions%2F460762%2Fhow-can-i-repair-the-windows-8-efi-bootloader&ei=VQoxUYOQNtO30gG_-4AQ&usg=AFQjCNGP5DVV6uxAnP29YnsjJQ44XIOgig, as accessed May 9, 2013, (Aug. 12, 2012).

(Continued)

*Primary Examiner* — Tony Mahmoudi
*Assistant Examiner* — Michael Le
(74) *Attorney, Agent, or Firm* — FisherBroyles LLP

(57) ABSTRACT

A computer-implemented method for facilitating features of system recovery environments during restore operations may include (1) identifying an automated backup tool capable of backing up system state data of a computing system, (2) detecting a backup operation performed on the computing system, (3) determining, during the backup operation, that the computing system includes (i) a boot volume that supports an operating system of the computing system and (ii) at least one separate recovery volume that facilitates the use of at least one feature of a system recovery environment, and then (4) directing the automated backup tool to back up the separate recovery volume as system state data to enable the system recovery environment to provide the feature based at least in part on the separate recovery volume during a restore of the computing system. Various other methods, systems, and computer-readable media are also disclosed.

16 Claims, 8 Drawing Sheets

(56) References Cited

U.S. PATENT DOCUMENTS

| | | | | |
|---|---|---|---|---|
| 8,789,208 B1* | 7/2014 | Sundaram | ............... | H04L 29/06 |
| | | | | 726/28 |
| 9,347,137 B2* | 5/2016 | Teramoto | ............. | B22F 1/0062 |
| 2004/0010487 A1* | 1/2004 | Prahlad | ............... | G06F 11/1435 |
| 2004/0250033 A1* | 12/2004 | Prahlad | ............... | G06F 11/1451 |
| | | | | 711/162 |
| 2007/0150651 A1* | 6/2007 | Nemiroff | ............ | G06F 11/1417 |
| | | | | 711/114 |
| 2010/0049750 A1* | 2/2010 | Srivastava | .......... | G06F 11/1435 |
| | | | | 707/E17.005 |
| 2010/0106955 A1* | 4/2010 | Odell | .................... | G06F 9/4416 |
| | | | | 713/2 |
| 2010/0205392 A1* | 8/2010 | Schnapp | ............. | G06F 11/2066 |
| | | | | 711/162 |

OTHER PUBLICATIONS

"After restoring in uEFI, can not start the Windows Recovery Environment(HDM 12 Pro)", http://www.wilderssecurity.com/showthread.php?t=339066, as accessed May 9, 2013, (Jan. 3, 2013).
"Arcserve", http://www.arcserve.com/us/default.aspx, as accessed May 9, 2013, (Oct. 19, 2010).
"Commvault", http://www.commvault.com/, as accessed May 9, 2013, (Dec. 2, 1998).

* cited by examiner

SYSTEMS AND METHODS FOR FACILITATING FEATURES OF SYSTEM RECOVERY ENVIRONMENTS DURING RESTORE OPERATIONS

BACKGROUND

Computing devices may include volumes that store data for a variety of purposes. For example, a computing device may launch an installation package configured to install an operating system to the computing device. During the install of the operating system, the installation package may create a boot volume used to boot the operating system on the computing device. In addition to creating this boot volume, the installation package may also create a separate volume that stores a bootable image used by a system recovery environment to recover data from the computing device in the event of a failure.

Unfortunately, traditional backup processes may be unable to back up certain data components stored in this separate volume. These data components may facilitate one or more user-accessible recovery features of the system recovery environment. As a result, the system recovery environment may be unable to provide these recovery features to the user during a restore of the computing device.

As such, the instant disclosure identifies and addresses a need for systems and methods for facilitating features of system recovery environments during restore operations.

SUMMARY

As will be described in greater detail below, the instant disclosure generally relates to systems and methods for facilitating features of system recovery environments during restore operations by backing up separate recovery volumes that facilitate these features as system state data.

In one example, a computer-implemented method for facilitating features of system recovery environments during restore operations may include (1) identifying an automated backup tool capable of backing up system state data of a computing system, (2) detecting a backup operation performed on the computing system, (3) determining, during the backup operation, that the computing system includes (i) a boot volume that supports an operating system of the computing system and (ii) at least one separate recovery volume that facilitates the use of at least one feature of a system recovery environment, and then (4) directing the automated backup tool to back up the separate recovery volume as system state data to enable the system recovery environment to provide the feature based at least in part on the separate recovery volume during a restore of the computing system.

In some examples, the separate recovery volume may include at least one file (such as a bootable image) that enables the system recovery environment to provide the feature during the restore of the computing system. This feature of the system recovery environment may include an option to boot the computing system into a safe mode and/or recovery mode. Additionally or alternatively, the feature of the system recovery environment may include an option to reset and/or refresh the computing system.

In some examples, the backup operation may include a cloud-based backup operation. In addition, the restore of the computing system may include a bare-metal restore operation.

In some embodiments, the method may also include directing the automated backup tool to provide the separate recovery volume as system state data to a remote backup system during the backup operation. The method may also include restoring the separate recovery volume to the computing system from the system state data backed up by the automated backup tool.

In some examples, the method may also include identifying a disk management tool capable of providing a user of the computing system with a Graphical User Interface (GUI) for managing the boot volume and the separate recovery volume. In these examples, the method may further include directing the disk management tool to provide the user with an option to back up the separate recovery volume via the GUI.

In some embodiments, the method may also include identifying a data component that includes boot configuration data (sometimes referred to by the acronym "BCD") used to boot the computing system. In these embodiment, the method may further include directing the automated backup tool to add the separate recovery volume to a separate data component to be backed up as system state data.

In some examples, the computing system may include a Basic Input/Output System (BIOS) firmware interface. In these examples, the method may also include directing the automated backup tool to back up the separate data component along with the data component as system state data due at least in part to the computing system's BIOS configuration.

In some embodiments, the computing system may include an Extensible Firmware Interface (EFI). In these embodiments, the method may also include directing the automated backup tool to back up the separate data component as system state data without backing up the data component as system state data due at least in part to the computing system's EFI configuration.

In some examples, the method may also include identifying a globally unique identifier assigned to the separate recovery volume. In these examples, the method may further include identifying a file path to a bootable recovery image stored in the separate recovery volume. Additionally or alternatively, the method may include directing the automated backup tool to store the globally unique identifier and the file path in a file list of the separate data component to be backed up as system state data.

In some embodiments, the method may also include directing the automated backup tool to back up the separate recovery volume as a critical volume that is dependent upon the system state data. The method may also include detecting a restore operation performed on the computing system and then recreating the separate recovery volume based at least in part on the system state data in response to detecting the restore operation.

In some examples, the method may also include delivering the backed-up system state data to the system recovery environment to enable the system recovery environment to recreate the separate recovery volume. In these examples, the method may further include enabling the system recovery environment to provide the feature to a user of the computing system via a GUI.

In some embodiments, the method may also include identifying a Globally Unique Identifier (GUID) assigned to the separate recovery volume. In these embodiments, the method may further include assigning the GUID to the recreated separate recovery volume during the restore of the computing device.

In one embodiment, a system for implementing the above-described method may include (1) an identification module that identifies an automated backup tool capable of backing up system state data of a computing system, (2) a detection module that detects a backup operation performed on the computing system, (3) a determination module that determines, during the backup operation, that the computing system includes (i) a boot volume that supports an operating system of the computing system and (ii) at least one separate recovery volume that facilitates the use of at least one feature of a system recovery environment, and (4) a director module that directs the automated backup tool to back up the separate recovery volume as system state data to enable the system recovery environment to provide the feature based at least in part on the separate recovery volume during a restore of the computing system. The system may also include at least one processor configured to execute the identification module, the detection module, the determination module, and the director module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an automated backup tool capable of backing up system state data of a computing system, (2) detect a backup operation performed on the computing system, (3) determine, during the backup operation, that the computing system includes (i) a boot volume that supports an operating system of the computing system and (ii) at least one separate recovery volume that facilitates the use of at least one feature of a system recovery environment, and then (4) direct the automated backup tool to back up the separate recovery volume as system state data to enable the system recovery environment to provide the feature based at least in part on the separate recovery volume during a restore of the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
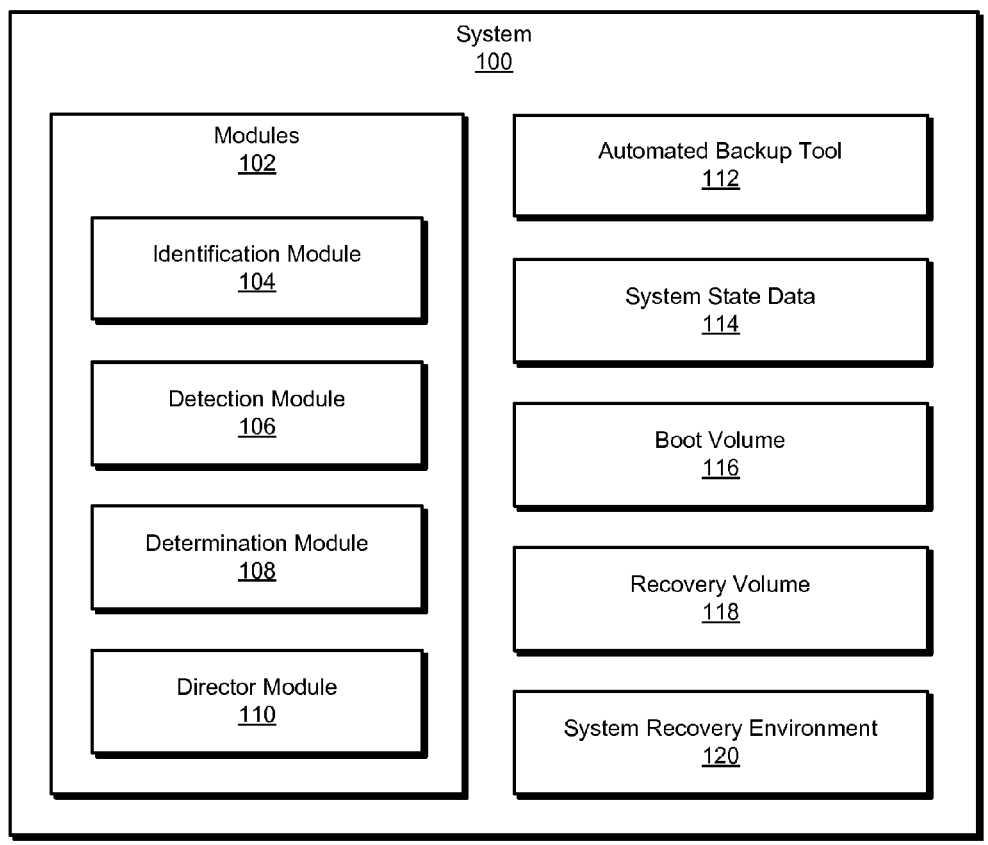
FIG. 1 is a block diagram of an exemplary system for facilitating features of system recovery environments during restore operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for facilitating features of system recovery environments during restore operations. As will be explained in greater detail below, the various systems and methods described herein may determine that a computing system includes a separate recovery volume that facilitates the use of one or more user-accessible recovery features of a system recovery environment. By determining that the computing system includes the separate recovery volume, the various systems and methods described herein may determine that an automated backup tool of the computing system is currently unable (or not configured) to back up certain data that facilitates these user-accessible features of the system recovery environment. In response to this determination, the various systems and methods described herein may direct the automated backup tool to back up the separate recovery volume as system state data to enable the system recovery environment to provide the features based at least in part on the separate recovery volume during a restore of the computing system.

Figure 2:
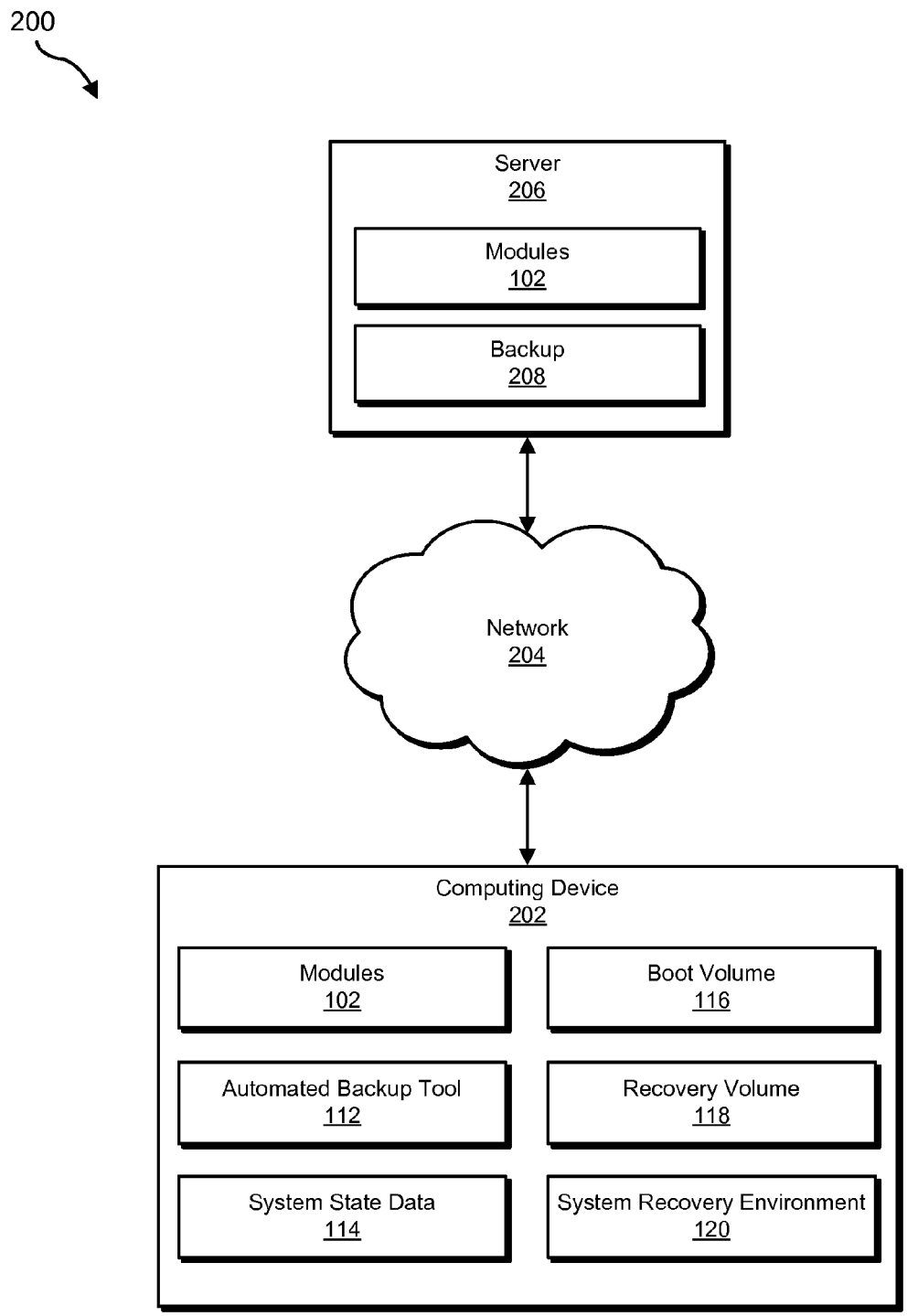
FIG. 2 is a block diagram of an exemplary system for facilitating features of system recovery environments during restore operations.
Figure 3:
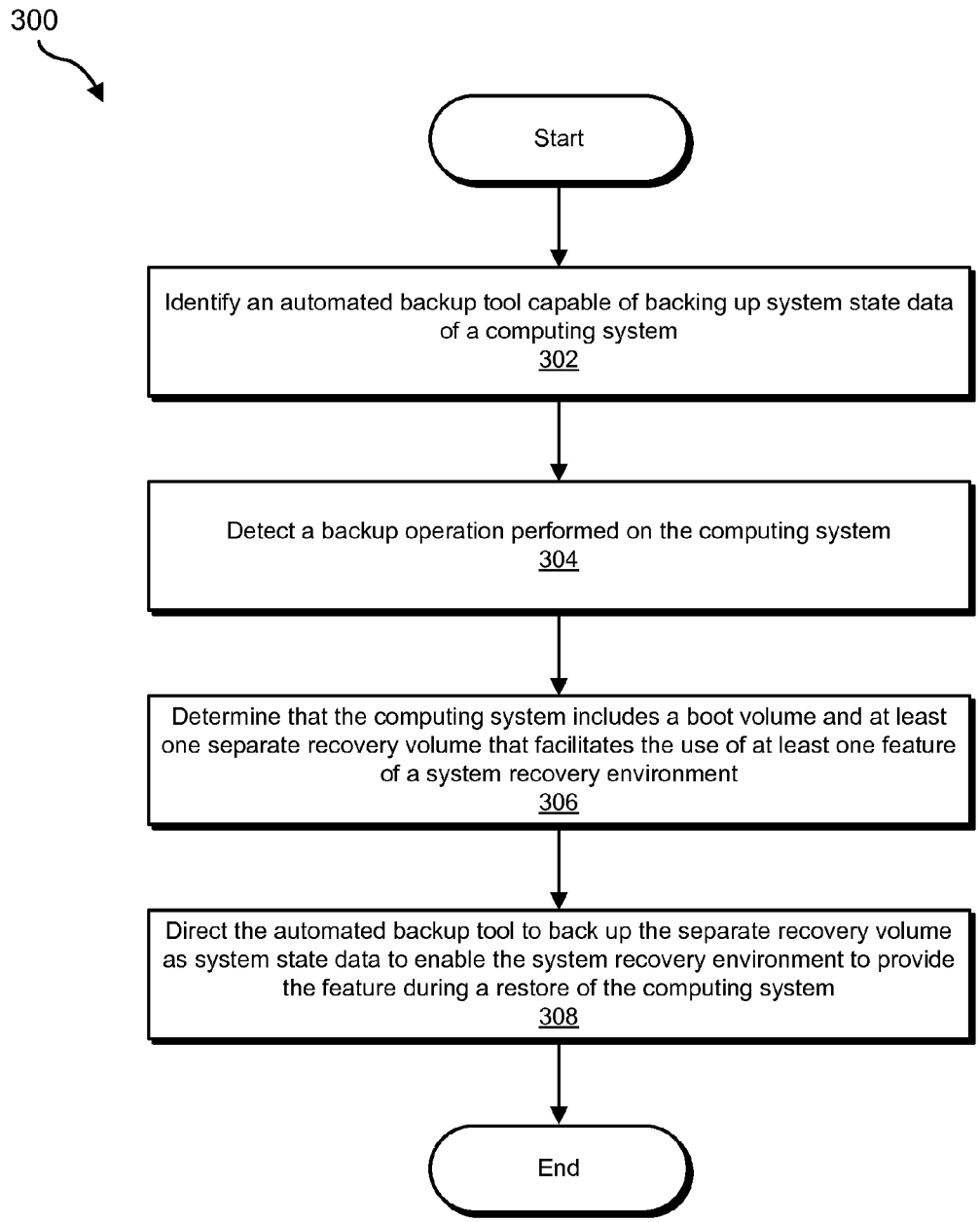
FIG. 3 is a flow diagram of an exemplary method for facilitating features of system recovery environments during restore operations.
Figure 4:
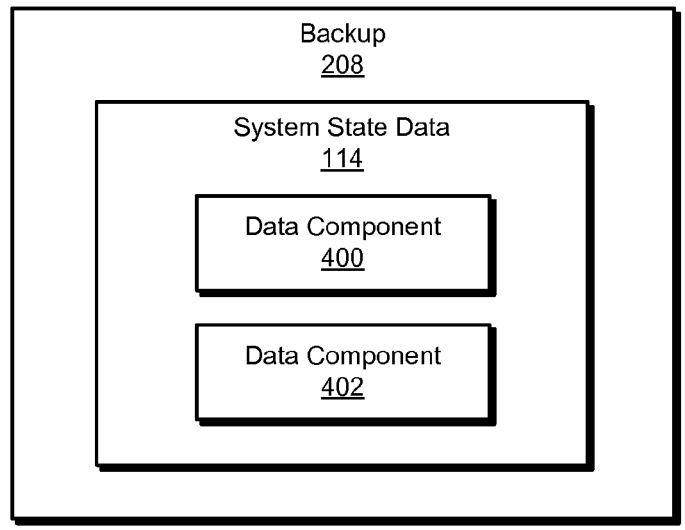
FIG. 4 is a block diagram of an exemplary system for facilitating features of system recovery environments during restore operations.
Figure 4:
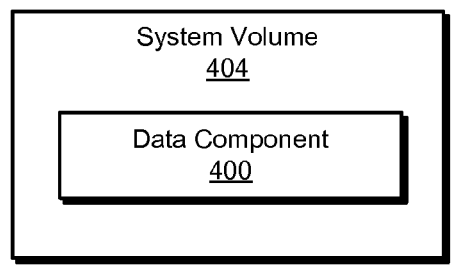
Figure 4:
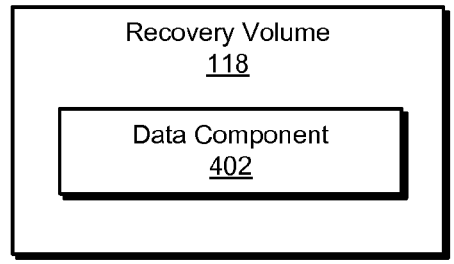

The following will provide, with reference to FIGS. 1, 2, and 4, detailed descriptions of exemplary systems for facilitating features of system recovery environments during restore operations. Detailed descriptions of corresponding computer-implemented methods will be provided in connection with FIG. 3. Detailed descriptions of exemplary GUIDs and image paths will be provided in connection with FIG. 5, and detailed descriptions of exemplary component file paths will be provided in connection with FIG. 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for facilitating features of system recovery environments during restore operations. As illustrated in this figure, exemplary system 100 may include one or more modules 102 for performing one or more tasks. For example, and as will be explained in greater detail below, exemplary system 100 may include an identification module 104 that identifies an automated backup tool capable of backing up system state data of a computing system. Exemplary system 100 may also include a detection module 106 that detects a backup operation performed on the computing system.

In addition, and as will be described in greater detail below, exemplary system 100 may include a determination module 108 that determines, during the backup operation, that the computing system includes (1) a boot volume that supports an operating system of the computing system and (2) at least one separate recovery volume that facilitates the use of at least one feature of a system recovery environment. Exemplary system 100 may further include a director module 110 that directs the automated backup tool to back up the separate recovery volume as system state data to enable the system recovery environment to provide the feature based at least in part on the separate recovery volume. Although illustrated as separate elements, one or more of modules 102 in FIG. 1 may represent portions of a single module or application (such as SYMANTEC BACKUP EXEC, SYMANTEC NETBACKUP, SYMANTEC SYSTEM RECOVERY, COMMVAULT SIMPANA, CA TECHNOLOGIES ARCSERVE, VMWARE CONSOLIDATED BACKUP, VEEAM BACKUP AND REPLICATION, IBM TRIVOLI STORAGE MANAGER, QUEST VRANGER, or ACRONIS BACKUP & RECOVERY).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 may also include one or more databases (not illustrated in FIG. 1) located on one or more computing devices. In one example, a database may be configured to store any data and/or information used to facilitate features of system recovery environments during restore operations. For example, the database may store a recovery volume (such as recovery volume 118 in FIG. 1) that includes one or more files used by a system recovery environment (such as system recovery environment 120 in FIG. 1) to provide one or more user-accessible recovery features.

Such databases may represent portions of a single database or computing device or a plurality of databases or computing devices. For example, a database may represent a portion of computing device 202 and/or server 206 in FIG. 2, computing system 710 in FIG. 7, and/or portions of exemplary network architecture 800 in FIG. 8. Additionally or alternatively, a database may represent one or more physically separate devices capable of being accessed by a computing device, such as computing device 202 and/or server 206 in FIG. 2, computing system 710 in FIG. 7, and/or portions of exemplary network architecture 800 in FIG. 8.

As illustrated in FIG. 1, exemplary system 100 may also include one or more automated backup tools, such as automated backup tool 112. The phrase "automated backup tool," as used herein, generally refers to any type or form of mechanism capable of backing up system state data of a computing device. Examples of automated backup tool 112 include, without limitation, one or more portions of MICROSOFT AUTOMATED SYSTEM RECOVERY (ASR) writer, MICROSOFT VOLUME SHADOW COPY SERVICE (VSS), MICROSOFT WINDOWS PREINSTALLATION ENVIRONMENT (WINPE), combinations of one or more of the same, or any other suitable automated backup tool.

As illustrated in FIG. 1, exemplary system 100 may also include system state data, such as system state data 114. The phrase "system state data," as used herein, generally refers to any type or form of data and/or information that facilitates booting an operating system on a computing device. Examples of system state data 114 include, without limitation, one or more boot files, system files, files protected by MICROSOFT WINDOWS FILE PROTECTION (WFP), active directories, system volumes (such as MICROSOFT SYSVOL), certificate services, cluster databases, MICROSOFT WINDOWS REGISTRY, performance counter configuration information, MICROSOFT COMPONENT SERVICES registration databases, combinations of one or more of the same, or any other suitable system state data.

In one example, system state data 114 may be specific to and/or defined by an operating system. For example, a MICROSOFT WINDOWS operating system installed on a computing device (such as computing device 202 in FIG. 2) may designate a variety of files, directories, and/or databases as system state data. In this example, the files, directories, and/or databases designated by the MICROSOFT WINDOWS operating system may collectively represent the system state data of the computing device.

As illustrated in FIG. 1, exemplary system 100 may also include one or more boot volumes, such as boot volume 116. The phrase "boot volume," as used herein, generally refers to any type or form of storage area that stores one or more files, directories, and/or databases that support an operating system. For example, boot volume 116 may include one or more files that facilitate booting a MICROSOFT WINDOWS operating system on a computing device (such as computing device 202 in FIG. 2).

As illustrated in FIG. 1, exemplary system 100 may also include one or more recovery volumes, such as recovery volume 118. The phrase "recovery volume," as used herein, generally refers to any type or form of storage area that stores one or more files, directories, and/or databases used by a system recovery environment to recover certain data from a computing device in the event of a failure. For example, recovery volume 118 may include one or more files that enable a system recovery environment (such as system recovery environment 120 in FIG. 1) to recover critical data and/or system components from a computing device (such as computing device 202 in FIG. 2) in the event of a failure. Additionally or alternatively, recovery volume 118 may include one or more files that enable the system recovery environment to provide one or more user-accessible features during a restore of the computing device.

Exemplary system 100 may also include a system volume not illustrated in FIG. 1. The phrase "system volume," as used herein, generally refers to any type or form of storage area that stores hardware-specific files, directories, and/or databases that enable an operating system to run on a computing device. In one example, a system volume (such as system volume 404 in FIG. 4) and boot volume 116 may represent portions of the same volume. In another example, the system volume and boot volume 116 may represent distinct volumes.

As illustrated in FIG. 1, exemplary system 100 may also include one or more system recovery environments, such as system recovery environment 120. The phrase "system recovery environment," as used herein, generally refers to any type or form of mechanism capable of diagnosing and/or overcoming failures that prevent an operating system from booting properly on a computing device. Examples of system recovery environment 120 include, without limitation, MICROSOFT WINDOWS RECOVERY ENVIRONMENT (WINRE), WINPE, MICROSOFT DIAGNOSTIC AND RECOVERY TOOLSET (DART), combinations of one or more of the same, or any other suitable system recovery environment.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, computing device 202 may include automated backup tool 112, system state data 114, boot volume 116, recovery volume 118, and/or system recovery environment 120.

As shown in FIG. 2, server 206 may be programmed with one or more of modules 102. Additionally or alternatively, server 206 may store one or more backups, such as backup 208. The term "backup," as used herein, generally refers to any type or form of reserve copy of one or more data components located on a computing device. In one example, backup 208 may include a reserve copy of one or more data components found in boot volume 116 and/or recovery volume 118 located on computing device 202.

In one embodiment, one or more of modules 102 from FIG. 1 may, when executed by at least one processor of computing device 202 and/or server 206, enable computing device 202 and/or server 206 to facilitate features of system recovery environments during restore operations. For example, and as will be described in greater detail below, one or more of modules 102 may cause computing device 202 and/or server 206 to (1) identify an automated backup tool (such as automated backup tool 112) capable of backing up system state data (such as system state data 114) of a computing system (such as computing device 202), (2) detect a backup operation performed on the computing system, (3) determine, during the backup operation, that the computing system includes (i) a boot volume (such as boot volume 116) that supports an operating system of the computing system and (ii) at least one separate recovery volume (such as recovery volume 118) that facilitates the use of at least one feature of a system recovery environment (such as system recovery environment 220), and then (4) direct the automated backup tool to back up the separate recovery volume as system state data to enable the system recovery environment to provide the feature based at least in part on the separate recovery volume during a restore of the computing system.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 710 in FIG. 7, or any other suitable computing device.

Server 206 generally represents any type or form of computing device capable of facilitating backup and/or restore operations in a network environment. Examples of server 206 include, without limitation, application servers, web servers, storage servers, deduplication servers, and/or database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless and/or wired connections. In one embodiment, network 204 may facilitate communication between computing device 202 and server 206.

FIG. 3 is a flow diagram of an exemplary computer-implemented method 300 for facilitating features of system recovery environments during restore operations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify an automated backup tool capable of backing up system state data of a computing system. For example, at step 302 identification module 104 may, as part of computing device 202 and/or server 206 in FIG. 2, identify automated backup tool 112. In this example, automated backup tool 112 may be configured to back up at least a portion of system state data 114 of computing device 202.

The systems described herein may perform step 302 in a variety of ways. In one example, identification module 104 may search computing device 202 for automated backup tool 112 based at least in part on the operating system installed on computing device 202. For example, identification module 104 may determine that a MICROSOFT WINDOWS 8 or WINDOWS SERVER 2012 operating system is installed on computing device 202. Upon determining that the MICROSOFT WINDOWS 8 or WINDOWS SERVER 2012 operating system is installed on computing device 202, identification module 104 may search computing device 202 for the location known to store the automated backup tool that provides disaster recovery and/or bare-metal restore services for that specific operating system. Identification module 104 may then identify automated backup tool 112 at this location during the search of computing device 202.

In one example, identification module 104 may query the operating system installed on computing device 202 for automated backup tool 112. For example, identification module 104 may query the operating system installed on computing device 202 for the automated backup tool that provides disaster recovery and/or bare-metal restore services for that specific operating system. In response to this query, the operating system may notify identification module 104 that automated backup tool 112 provides those disaster recovery and/or bare-metal restore services. Additionally or alternatively, the operating system may notify identification module 104 of the location of automated backup tool 112 on computing device 202.

Returning to FIG. 3, at step 304 one or more of the systems described herein may detect a backup operation performed on the computing system. For example, at step 304 detection module 106 may, as part of computing device 202 and/or server 206 in FIG. 2, detect a backup operation performed on computing device 202. Examples of this backup operation include a Simplified System Protection (SSP) backup operation, a cloud-based backup operation, an online backup operation, a remote backup operation, a local backup operation, combinations of one or more of the same, or any other suitable backup operation.

The systems described herein may perform step 304 in a variety of ways. In some examples, detection module 106 may detect the backup operation prior to initiation of the backup operation. In one example, detection module 106 may detect a request to perform a backup operation. For example, detection module 106 may detect a request initiated by a user of computing device 202 to perform an SSP backup operation on computing device 202. Additionally or alternatively, detection module 106 may detect a request to perform a scheduled or periodic SSP backup operation as part of a backup policy applied to computing device 202.

In some examples, detection module 106 may detect the backup operation after initiation of the backup operation. In one example, detection module 106 may detect an event that suggests the backup operation is currently in progress. For example, while monitoring computing device 202, detection module 106 may detect a read/write operation performed by automated backup tool 112. Detection module 106 may then determine that this read/write operation suggests that an SSP backup operation has been initiated on computing device 202.

Returning to FIG. 3, at step 306 one or more of the systems described herein may determine that the computing system includes a boot volume and at least one separate recovery volume that facilitates the use of at least one feature of a system recovery environment. For example, at step 306 determination module 108 may, as part of computing device 202 and/or server 206 in FIG. 2, determine that computing device 202 includes boot volume 116 and recovery volume 118. In this example, determination module 108 may make this determination during the backup operation performed on computing device 202.

The systems described herein may perform step 306 in a variety of ways. In some examples, determination module 108 may initiate this determination in response to the detection of the backup operation. In one example, determination module 108 may query the operating system for whether computing device 202 includes a recovery volume that is distinct from the operating system's boot volume. For example, determination module 108 may make at least one WINDOWS MANAGEMENT INSTRUMENTATION (WMI) call that queries the operating system installed on computing device 202. In response to this WMI call, the operating system may notify determination module 108 that computing device 202 includes recovery volume 118, which is distinct from boot volume 116.

In one example, determination module 108 may determine that computing device 202 includes both boot volume 116 and recovery volume 118 based at least in part on the operating system installed on computing device 202. For example, determination module 108 may determine that the MICROSOFT WINDOWS 8 or WINDOWS SERVER 2012 operating system is installed on computing device 202. Upon making this determination, determination module 108 may query a knowledge base that identifies whether that specific operating system creates a recovery volume that is distinct from the boot volume during installation. Determination module 108 may then confirm that computing device 202 includes both boot volume 116 and recovery volume 118 based at least in part on this query of the knowledge base.

In one example, determination module 108 may determine that computing device 202 includes both boot volume 116 and recovery volume 118 during an enumeration of system state data 114. For example, automated backup tool 112 may enumerate system state data 114 as part of the backup operation performed on computing device 202. In this example, determination module 108 may identify both boot volume 116 and recovery volume 118 during this enumeration of system state data 114.

Figure 5:
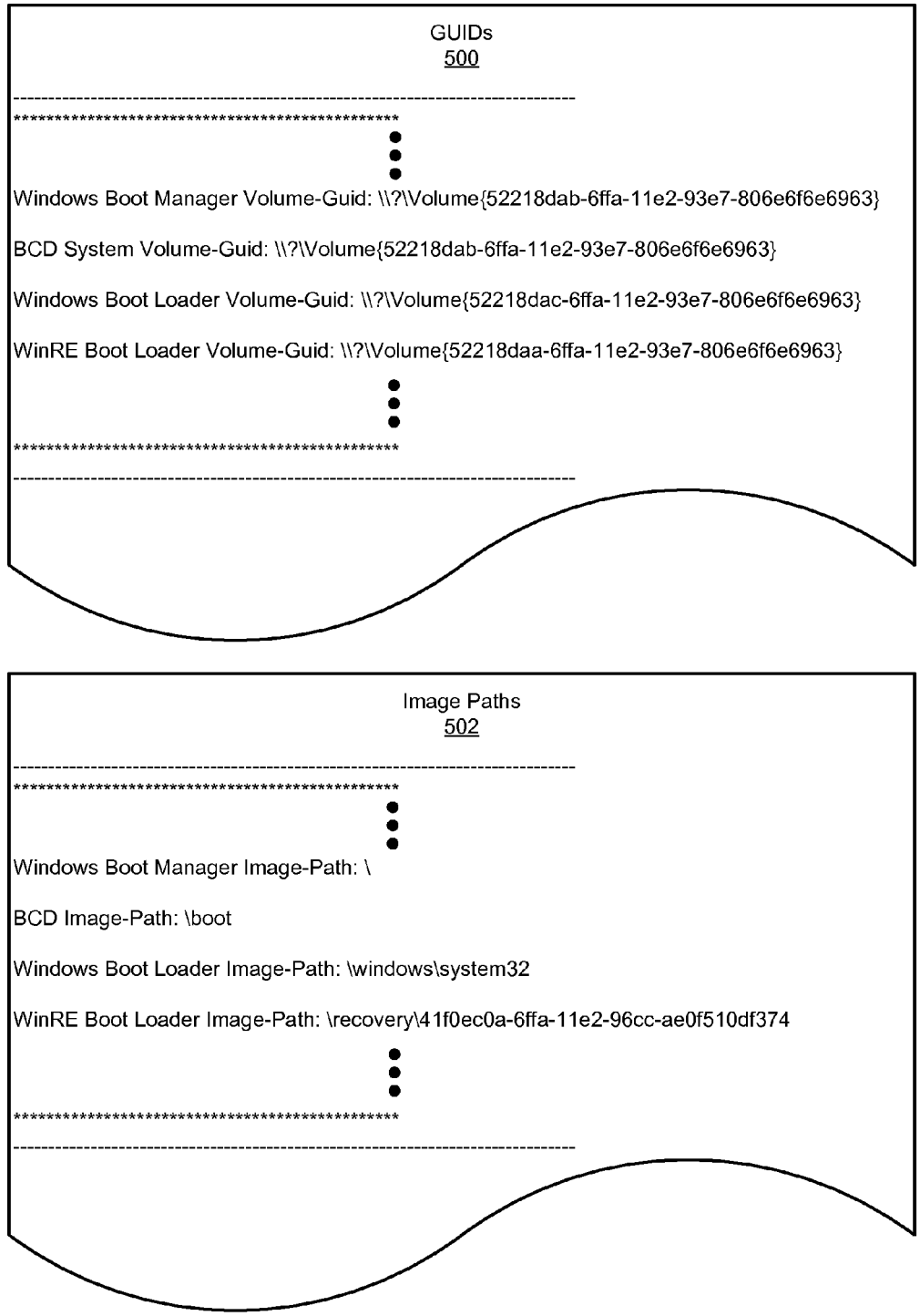
FIG. 5 is an illustration of exemplary GUIDs assigned to volumes of a computing system and image paths to bootable images stored in these volumes.

In some examples, determination module 108 may identify a GUID assigned to recovery volume 118 on computing device 202. In one example, determination module 108 may obtain a listing of GUIDs that uniquely identify each volume on computing device 202. For example, determination module 108 may obtain a listing of GUIDs 500 in FIG. 5 during the enumeration of system state data 114. As illustrated in FIG. 5, GUIDs 500 may include a GUID assigned to a WINDOWS BOOT MANAGER VOLUME (in this example, "52218dab-6ffa-11e2-93e7-806e6f6e6963"), a GUID assigned to a BCD system volume (in this example, "52218dab-6ffa-11e2-93e7-806e6f6e6963"), a GUID assigned to a WINDOWS BOOT LOADER volume (in this example, "52218dac-6ffa-11e2-93e7-806e6f6e6963"), and a GUID assigned to a WINRE BOOT LOADER volume (in this example, "52218daa-6ffa-11e2-93e7-806e6f6e6963").

In one example, determination module 108 may analyze the listing of GUIDs 500 and identify the GUID assigned to the recovery volume 118 based at least in part on this analysis. For example, determination module 108 may identify the WINRE BOOT LOADER volume listed in GUIDs 500 as representing recovery volume 118. Determination module 108 may then determine that the "52218daa-6ffa-11e2-93e7-806e6f6e6963" GUID has been assigned to recovery volume 118.

In some examples, determination module 108 may identify a file path to a bootable recovery image stored in recovery volume 118 on computing device 202. In one example, determination module 108 may obtain a listing that identifies a file path to a bootable image stored in each volume on computing device 202. For example, determination module 108 may obtain a listing of image paths 502 in FIG. 5 during the enumeration of system state data 114. As illustrated in FIG. 5, image paths 502 may include a file path to bootable image stored in the WINDOWS BOOT MANAGER VOLUME (in this example, "\"), a file path to a bootable image stored in the BCD system volume (in this example, "\boot"), a file path to a bootable image stored in the WINDOWS BOOT LOADER volume (in this example, "\windows\system32"), and a file path to a bootable recovery image stored in the WINRE BOOT LOADER volume (in this example, "\recovery\41f0ec0a-6ffa-11e2-96cc-ae0f51df374").

In one example, determination module 108 may analyze the listing of file paths 502 and identify the file path to a bootable recovery image stored in recovery volume 118 based at least in part on this analysis. For example, determination module 108 may identify the image path to the bootable recovery image stored in the WINRE BOOT LOADER volume in the listing of image paths 502. Determination module 108 may then determine that the "\recovery\41f0ec0a-6ffa-11e2-96cc-ae0f51df374" file path corresponds to the bootable recovery image stored in recovery volume 118 since the WINRE BOOT LOADER volume represents recovery volume 118.

In some examples, recovery volume 118 remain unmounted. For example, the MICROSOFT WINDOWS 8 or WINDOWS SERVER 2012 operating system installed on computing device 202 may not mount recovery volume 118. As a result, a user of computing device 202 may be unable to access recovery volume 118 or assign a drive letter to recovery volume 118.

In one example, recovery volume 118 may store one or more files that facilitate the use of one or more features of system recovery environment 120. For example, recovery volume 118 may include a "Boot.sdi" file, a "ReAgent.xml" file, and/or a "WinRE.wim" file. These files may facilitate the use of one or more features of system recovery environment 120. Examples of these features of system recovery environment 120 include, without limitation, an option to boot computing device 202 into safe mode, an option to boot computing device 202 into recovery mode, an option to reset computing device 202, an option to refresh computing device 202, combinations of one or more of the same, or any other suitable features.

Returning to FIG. 3, at step 308 one or more of the systems described herein may direct the automated backup tool to back up the separate recovery volume as system state data. For example, at step 308 director module 110 may, as part of computing device 202 and/or server 206 in FIG. 2, direct the automated backup tool 112 to back up recovery volume 118 as part of system state data 114. By directing automated backup tool 112 to back up recovery volume 118 as part of system state data 114, director module 110 may enable system recovery environment 120 to provide one or more user-accessible features based at least in part on recovery volume 118 during a restore of computing device 202.

The systems described herein may perform step 308 in a variety of ways. In some examples, director module 110 may augment automated backup tool 112 to facilitate backing up certain data components of recovery volume 118 as part of system state data 114. In one example, director module 110 may direct automated backup tool 112 to use at least one data component included in recovery volume 118 for a different purpose. For example, director module 110 may direct automated backup tool 112 to back up data component 402 in FIG. 4 as part of system state data 114 for the purpose of presenting, backing up, and/or restoring critical data (e.g., WINRE data) stored in recovery volume 118.

As illustrated in FIG. 4, data component 402 may represent at least a portion of recovery volume 118. In one example, data component 402 may include the "Boot.sdi" file, the "ReAgent.xml" file, and/or the "WinRE.wim" file stored in recovery volume 118. In this example, data component 402 may facilitate the use of one or more features of system recovery environment 120.

In one example, automated backup tool 112 may be unable (or not configured) to back up data component 402 as part of system state data 114 for disaster and/or bare-metal recovery purposes. Instead, in this example, automated backup tool 112 may be able (or configured) to back up only data component 400 of system volume 404 for disaster and/or bare-metal recovery purposes.

As illustrated in FIG. 4, data component 400 may represent at least a portion of system volume 404. In one example, data component 400 may include BCD data used by a boot manager (such as MICROSOFT WINDOWS BOOT MANAGER) to boot the operating system installed on computing device 202.

Unfortunately, in the event that data component 402 facilitates the use of one or more features of system recovery environment 120 but automated backup tool 112 is unable (or not configured) to back up data component 402 as part of system state data 114, system recovery environment 120 may be unable to provide those features to the user without assistance. However, director module 110 may enable system recovery environment 120 to provide one or more of those features to the user during a restore of computing device 208 by directing automated backup tool 112 to back up data component 402 in addition to data component 400 as part of system state data 114.

In one example, automated backup tool 112 may add at least a portion of recovery volume 118 to a backup component document in response to the directive from director module 110. For example, automated backup tool 112 may add data component 402 as a VSS component to the tool's backup document. Automated backup tool 112 may later back up data component 402 as part of system state data 114 since data component 402 is listed as a VSS component in the tool's backup document.

In some examples, director module 110 may direct automated backup tool 112 to provide at least a portion of recovery volume 118 as system state data 114 to a remote backup system during the backup operation. For example, in the event that computing device 202 has a BIOS configuration, director module 110 may direct automated backup tool 112 to backup data component 402 along with data component 400 as system state data 114. In response to this directive from director module 110, automated backup tool 112 may capture backup 208 of system state data 114 in FIG. 4 with data component 402 and data component 400 due at least in part to the BIOS configuration of computing device 202.

Upon capturing backup 208 of system state data 114, director module 110 may provide backup 208 to the remote backup system running on server 206. Examples of this remote backup system include, without limitation, SYMANTEC BACKUP EXEC, SYMANTEC NETBACKUP, SYMANTEC SYSTEM RECOVERY, COMMVAULT SIMPANA, CA TECHNOLOGIES ARCSERVE, VMWARE CONSOLIDATED BACKUP, VEEAM BACKUP AND REPLICATION, IBM TRIVOLI STORAGE MANAGER, QUEST VRANGER, or ACRONIS BACKUP & RECOVERY, combinations of one or more of the same, or any other suitable remote backup system.

In the event that computing device 202 has an EFI configuration, director module 110 may direct automated backup tool 112 to backup data component 402 as part of system state data 114 without necessarily backing up data component 400 as part of system state data 114. In response to this directive from director module 110, automated backup tool 112 may capture backup 208 of system state data 114 with data component 402 but without data component 400 due at least in part to the EFI configuration of computing device 202. Since, in this example, computing device 202 has an EFI configuration, data component 400 may be backed up as part of the file system on the EFI system partition rather than system state data 114.

In one example, director module 110 may identify a disk management tool capable of providing the user of computing device 202 with a GUI for managing boot volume 116 and/or recovery volume 118. For example, director module 110 may identify a MICROSOFT DISK MANAGEMENT console installed on computing device 202. Upon identifying the MICROSOFT DISK MANAGEMENT console, director module 110 may direct the MICROSOFT DISK MANAGEMENT console to provide the user with an option to back up recovery volume 118 via the console's GUI. Computing device 202 may then receive user input requesting the option to back up recovery volume 118 via the console's GUI.

Figure 6:
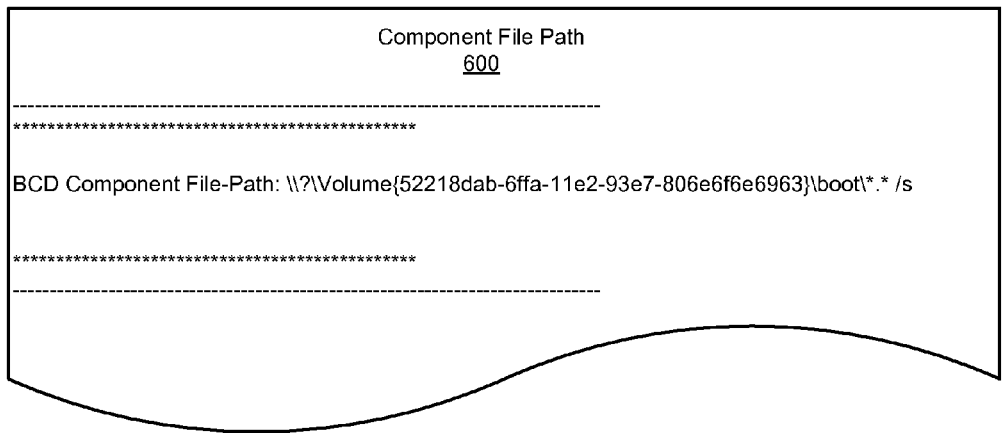
FIG. 6 is an illustration of exemplary component file paths that identify bootable images backed up as system state data.
Figure 6:
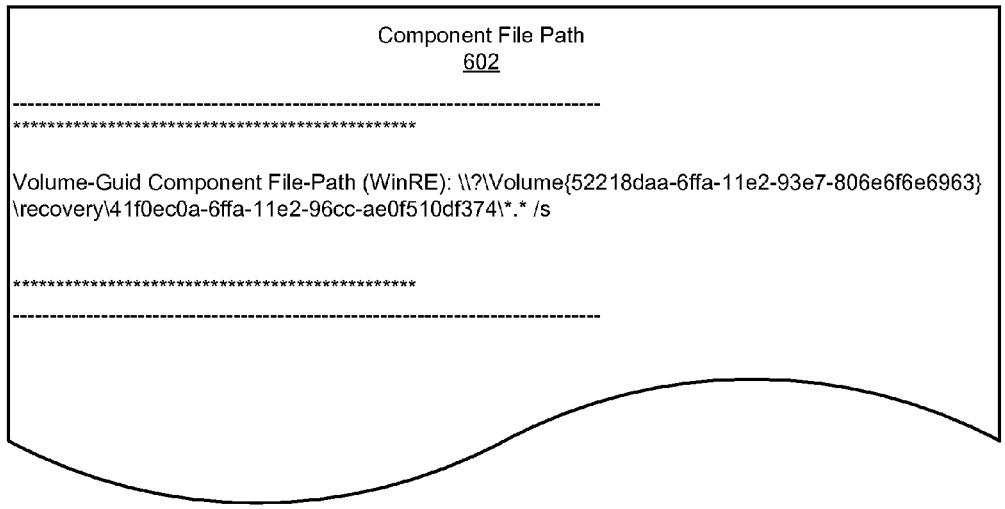

In one example, director module 110 may direct automated backup tool 112 to store the GUID assigned to recovery volume 118 and the file path to the bootable recovery image in a file list of recovery volume 118. In response to this directive from director module 110, automated backup tool 112 may create a component file path 602 in FIG. 6 that leads to data component 402. Automated backup tool 112 may then store component file path 602 in the file list of recovery volume 118 to be backed up as part of system state data 114. As illustrated in FIG. 6, component file path 602 may include a combination of the GUID assigned to recovery volume 118 and the file path to the bootable recovery image stored in recovery volume 118 (in this example, "{52218daa-6ffa-11e2-93e7-806e6f6e6963}\recovery\41f0ec0a-6ffa-11e2-96cc-ae0f510df374\*.*/s").

In addition, automated backup tool 112 may create a component file path 600 in FIG. 6 that leads to data component 400. Automated backup tool 112 may then store component file path 600 in the file list of system volume 404 to be backed up as part of system state data 114. As illustrated in FIG. 6, component file path 602 may include a combination of the GUID assigned to system volume 404 and the file path to the bootable image stored in system volume 404 (in this example, "{52218dab-6ffa-11e2-93e7-806e6f6e6963}\boot\*.*/s").

In some examples, director module 110 may direct automated backup tool 112 to back up recovery volume 118 as a critical volume. In one example, director module 110 may direct automated backup tool 112 to mark recovery volume 118 as a critical volume. In another example, director module 110 may mark recovery volume 118 as a critical volume. The term "critical volume," as used herein, generally refers to any type or form of volume that needs to be recreated and/or reconfigured prior to the recreation and/or reconfiguration of any other volumes (such as any non-critical volumes) during a restore operation.

Additionally or alternatively, director module 110 may direct automated backup tool 112 to back up recovery volume 118 as a dependent volume. In response to this directive from director module 110, automated backup tool 112 may add recovery volume 118 to system state data 114 as a dependent volume. The term "dependent volume," as used herein, generally refers to any type or form of volume that is dependent upon system state data.

In some examples, one or more of modules 102 may also facilitate restoring recovery volume 118 to computing device 202 in the event of a failure. In one example, detection module 106 may detect a request to restore computing device 202. For example, system recovery environment 120 may initiate a request for the backed-up copy of system state data 114 stored on server 206 in response to the operating system's failure to boot properly. Upon initiation of this request, system recovery environment 120 may direct computing device 202 to send the request to server 206 via network 204.

As server 206 receives the request from computing device 202, detection module 106 may detect the request. In response to the detection of the request, director module 110 may locate backup 208 on server 206 and then direct server 206 to deliver backup 208 to computing device 202 via network 204. By directing server 206 to deliver backup 208 to computing device 202, director module 110 may enable system recovery environment 120 to recreate recovery volume 118 based at least in part on the backed-up copy of system state data 114 included in backup 208.

Once computing device 202 receives backup 208 from server 206, system recovery environment 120 may recreate recovery volume 118 based at least in part on the backed-up copy of system state data 114. System recovery environment 120 may also identify "52218daa-6ffa-11e2-93e7-806e6f6e6963" as the original GUID assigned to recovery volume 118 based at least in part the file list of recovery volume 114 included in the backed-up copy of system state data 114. Director module 110 may then assign the "52218daa-6ffa-11e2-93e7-806e6f6e6963" GUID to the recreated version of recovery volume 118.

In one example, system recovery environment 120 may use the recreated version of recovery volume 118 to provide one or more of the features that were not previously provided to the user of computing device 202 via the environment's GUI. For example, system recovery environment 120 may load the recreated version of recovery volume 118 into the environment's GUI. By loading the recreated version of recovery volume 118 into the environment's GUI, system recovery environment 120 may enable the user to access one or more of these features via the GUI. Examples of these features of system recovery environment 120 include, without limitation, an option to boot computing device 202 into safe mode, an option to boot computing device 202 into recovery mode, an option to reset computing device 202, an option to refresh computing device 202, combinations of one or more of the same, or any other suitable features.

As explained above in connection with exemplary method 300 in FIG. 3, an operating system may create a boot volume and a separate recovery volume during installation. For example, a user may launch an installation package configured to install a MICROSOFT WINDOWS 8 or WINDOWS SERVER 2012 operating system to a computing device. During this install process, the installation package may create a boot volume that supports the MICROSOFT WINDOWS 8 or WINDOWS SERVER 2012 operating system and at least one separate recovery volume that facilitates the use of one or more features of the device's WINRE (such as the option to boot the computing device into a safe or recovery mode and/or the option to reset or refresh the computing device).

Unfortunately, the computing device's ASR writer may be unable (or not configured) to back up the separate recovery volume as part of the device's system state data. As a result, the device's WINRE may be unable (or not configured) to provide those features to the user in the event that a disaster recovery operation and/or bare-metal restore operation is needed by the computing device.

In an effort to overcome this deficiency, a backup and restore technology may direct the ASR writer to back up the separate recovery volume as part of the device's system state data. For example, SYMANTEC BACKUP EXEC may direct the ASR writer to add the separate recovery volume to the device's system state data as a new VSS component. By directing the ASR writer to add the separate recovery volume to the device's system state data, SYMANTEC BACKUP EXEC may obtain a backup copy of the separate recovery volume during an SSP backup operation.

In the event of a failure that prevents the MICROSOFT WINDOWS 8 or WINDOWS SERVER 2012 operating system from booting properly, SYMANTEC BACKUP EXEC may deliver the backup copy of the separate recovery volume to the device's WINRE. With this backup copy of the separate recovery volume, the device's WINRE may be able to provide those features facilitated by the separate recovery volume to the user via the WINRE's GUI.

Figure 7:
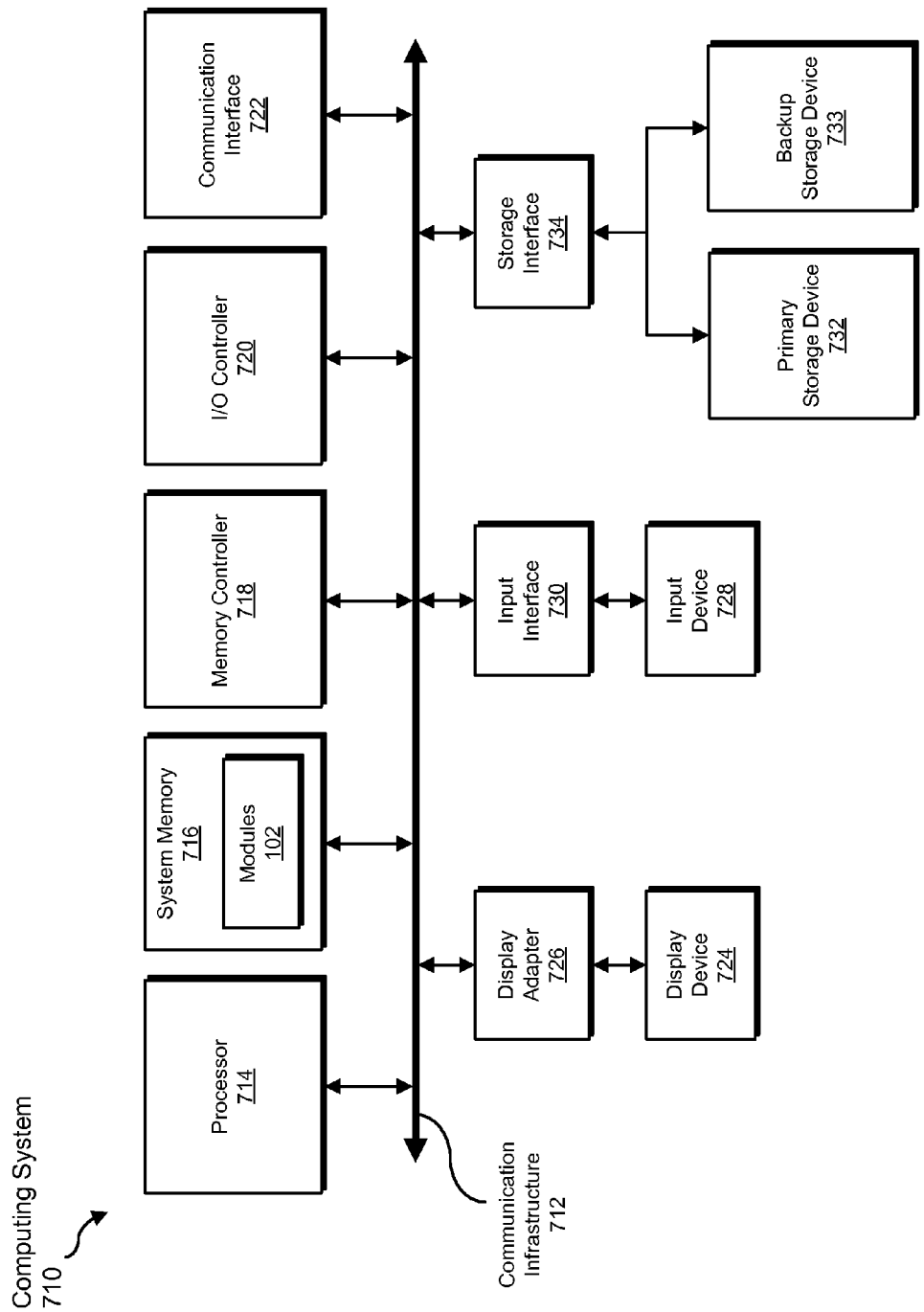
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 710. All or a portion of the computer program stored on the computer-readable-storage medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
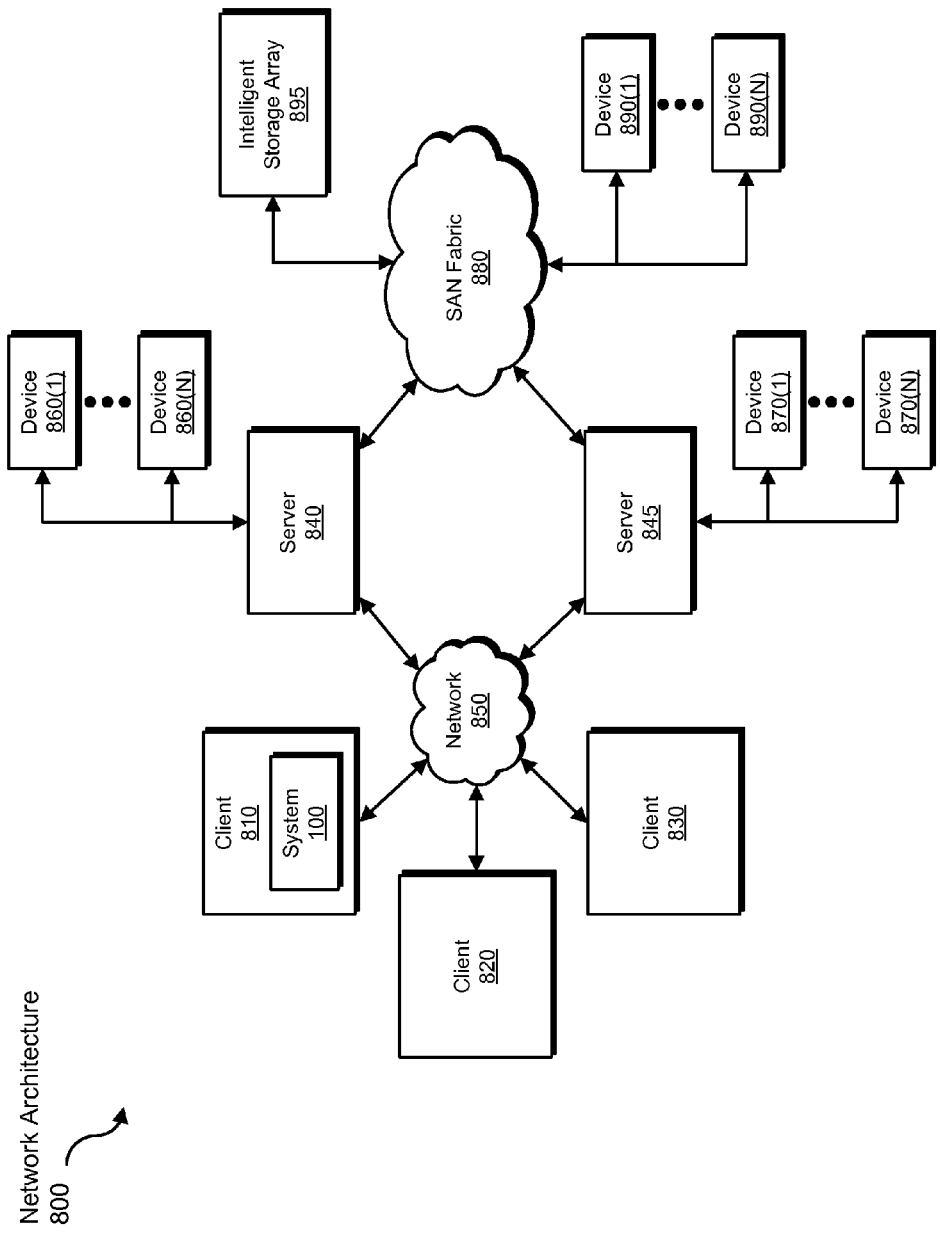
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)- (N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for facilitating features of system recovery environments during restore operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a recovery volume of a computing device to be transformed, transform the recovery volume, output a result of the transformation to a remote server, use the result of the transformation to facilitate the user of at least one feature of a system recovery environment, and store the result of the transformation to the computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating features of system recovery environments during restore operations, at least a portion of the method being performed by a computing device comprising at least one processor, the method comprising:
   identifying an automated backup tool capable of backing up system state data of a computing system;
   detecting a backup operation performed on the computing system;
   during the backup operation, determining that the computing system includes:
      a boot volume that supports an operating system of the computing system;
      at least one separate recovery volume that:
         includes a bootable recovery image capable of being executed by a system recovery environment;
         provides a user-selectable safe-mode option that enables the computing system to boot into a safe mode;
         has been assigned a 128-bit Globally Unique Identifier (GUID);
   determining that the automated backup tool is not configured to back up the separate recovery volume as system state data;
   determining that the computing system has a Basic Input/Output System (BIOS) configuration;
   in response to determining that the automated backup tool is not configured to back up the separate recovery volume as system state data and that the computing system has a BIOS configuration, directing the automated backup tool to back up the separate recovery volume by:
      adding a volume shadow copy component of the separate recovery volume to a backup document of the automated backup tool to be backed up as system state data;
      storing a component file path that leads to the separate recovery volume in a file list of the separate recovery volume to be backed up as system state data, the component file path including a combination of the 128-bit GUID assigned to the separate recovery volume and a file path to the bootable recovery image within the separate recovery volume;
      backing up the volume shadow copy component and the file list of the separate recovery volume as system state data due at least in part to the computing system having the BIOS configuration and the volume shadow copy component having been added to the backup document of the automated backup tool;
      providing the system state data that includes the volume shadow copy component and the file list of the separate recovery volume to a remote backup system during the backup operation to enable the system recovery environment to provide the user-selectable safe-mode option to a user of the computing system by way of the volume shadow copy component and the file list during a restore of the computing system.

2. The method of claim 1, wherein directing the automated backup tool to back up the separate recovery volume comprises:
   identifying a disk management tool capable of providing the user of the computing system with a graphical user interface for managing the boot volume and the separate recovery volume;
   directing the disk management tool to provide the user with an option to back up the separate recovery volume via the graphical user interface.

3. The method of claim 1, further comprising restoring the separate recovery volume to the computing system from the system state data backed up by the automated backup tool.

4. The method of claim 1, wherein directing the automated backup tool to back up the separate recovery volume comprises:
   identifying a data component that includes boot configuration data used to boot the computing system.

5. The method of claim 4, wherein:
   directing the automated backup tool to back up the separate recovery volume comprises directing the automated backup tool to add the volume shadow copy component along with the data component to the system state data due at least in part to the computing system having the BIOS configuration.

6. The method of claim 1, wherein directing the automated backup tool to back up the separate recovery volume comprises directing the automated backup tool to back up the separate recovery volume as a critical volume that is dependent upon the system state data.

7. The method of claim 1, further comprising:
   detecting a restore operation performed on the computing system;
   in response to detecting the restore operation, recreating the separate recovery volume based at least in part on the system state data backed up by the automated backup tool.

8. The method of claim 7, wherein:
   recreating the separate recovery volume comprises assigning the GUID to the recreated separate recovery volume.

9. The method of claim 8, wherein recreating the separate recovery volume comprises delivering the backed-up system state data to the system recovery environment to enable the system recovery environment to recreate the separate recovery volume.

10. The method of claim 9, wherein delivering the backed-up system state data to the system recovery environment comprises enabling the system recovery environment to provide the safe-mode option to the user of the computing system via a graphical user interface.

11. The method of claim 1, wherein the restore of the computing system comprises a bare-metal restore operation.

12. The method of claim 1, wherein the backup operation comprises a cloud-based backup operation.

13. The method of claim 1, wherein the separate recovery volume comprises at least one file that enables the system recovery environment to provide the safe-mode option during the restore of the computing system.

14. The method of claim 1, wherein the separate recovery volume also provides at least one of:
   an option to boot the computing system into a recovery mode;
   an option to reset the computing system;
   an option to refresh the computing system.

15. A system for facilitating features of system recovery environments during restore operations, the system comprising:
   a memory device that stores:
      an identification module that identifies an automated backup tool capable of backing up system state data of a computing system;
      a detection module that detects a backup operation performed on the computing system;
      a determination module that:
         determines, during the backup operation, that the computing system includes:
            a boot volume that supports an operating system of the computing system;
            at least one separate recovery volume that:
               includes a bootable recovery image capable of being executed by a system recovery environment;
               provides a user-selectable safe-mode option that enables the computing system to boot into a safe mode;
               has been assigned a 128-bit Globally Unique Identifier (GUID);
         determines that the automated backup tool is not configured to back up the separate recovery volume as system state data;
         determines that the computing system has a Basic Input/Output System (BIOS) configuration;
      a director module that directs, in response to the determination module determining that the automated backup tool is not configured to back up the separate recovery volume as system state data and that the computing system has a BIOS configuration, the automated backup tool to back up the separate recovery volume by:
         adding a volume shadow copy component of the separate recovery volume to a backup document of the automated backup tool to be backed up as system state data;
         storing a component file path that leads to the separate recovery volume in a file list of the separate recovery volume to be backed up as system state data, the component file path including a combination of the 128-bit GUID assigned to the separate recovery volume and a file path to the bootable recovery image within the separate recovery volume;
         backing up the volume shadow copy component and the file list of the separate recovery volume as system state data due at least in part to the computing system having the BIOS configuration and the volume shadow copy component having been added to the backup document of the automated backup tool;
         providing the system state data that includes the volume shadow copy component and the file list of the separate recovery volume to a remote backup system during the backup operation to enable the system recovery environment to provide the user-selectable safe-mode option to a user of the computing system by way of the volume shadow copy component and the file list during a restore of the computing system;
   at least one physical processor configured to execute the identification module, the detection module, the determination module, and the director module.

16. A non-transitory computer-readable-storage medium comprising one or more computer-executable instructions that, when executed by at least one processor of a computing device, cause the computing device to:
   identify an automated backup tool capable of backing up system state data of a computing system;
   detect a backup operation performed on the computing system;
   determine, during the backup operation, that the computing system includes:
      a boot volume that supports an operating system of the computing system;
      at least one separate recovery volume that:
         includes a bootable recovery image capable of being executed by a system recovery environment;
         provides a user-selectable safe-mode option that enables the computing system to boot into a safe mode;
         has been assigned a 128-bit Globally Unique Identifier (GUID);
   determine that the automated backup tool is not configured to back up the separate recovery volume as system state data;
   determine that the computing system has a Basic Input/Output System (BIOS) configuration;
   direct, in response to determining that the automated backup tool is not configured to back up the separate recovery volume as system state data and that the computing system has a BIOS configuration, the automated backup tool to back up the separate recovery volume by:

adding a volume shadow copy component of the separate recovery volume to a backup document of the automated backup tool to be backed up as system state data;

storing a component file path that leads to the separate recovery volume in a file list of the separate recovery volume to be backed up as system state data, the component file path including a combination of the 128-bit GUID assigned to the separate recovery volume and a file path to the bootable recovery image within the separate recovery volume;

backing up the volume shadow copy component and the file list of the separate recovery volume as system state data due at least in part to the computing system having the BIOS configuration and the volume shadow copy component having been added to the backup document of the automated backup tool;

providing the system state data that includes the volume shadow copy component and the file list of the separate recovery volume to a remote backup system during the backup operation to enable the system recovery environment to provide the user-selectable safe-mode option to a user of the computing system by way of the volume shadow copy component and the file list during a restore of the computing system.

* * * * *